United States Patent [19]

Hupa et al.

[11] Patent Number: 6,030,494
[45] Date of Patent: Feb. 29, 2000

[54] METHOD OF TREATING MELODOROUS GASES OF A PULP MILL

[75] Inventors: Mikko Hupa, Turku; Erkki Kiiskila, Karhula, both of Finland

[73] Assignee: Ahlstrom Machinery Oy, Helsinki, Finland

[21] Appl. No.: 09/145,971

[22] Filed: Sep. 3, 1998

[30] Foreign Application Priority Data

Sep. 5, 1997 [FI] Finland ..................................... 973617

[51] Int. Cl.$^7$ ............................ B01D 53/48; B01D 53/58
[52] U.S. Cl. ............................ 162/51; 423/224; 423/237; 423/238; 423/242.1; 423/243.09
[58] Field of Search ........................ 162/51, 29; 423/224, 423/237, 242.1, 243.09, 238

[56] References Cited

U.S. PATENT DOCUMENTS 4,001,374  1/1977  Haese ....................................... 423/237

FOREIGN PATENT DOCUMENTS

| 3-188923 | 8/1991 | Japan . |
| WO 94/20676 | 9/1994 | WIPO . |
| WO 96/23566 | 8/1996 | WIPO . |

OTHER PUBLICATIONS

Rushton "Collection and Treatment of Odorous Kraft Mill Gases" Paper Trade Journal, pp. 36 & 37, Dec. 18, 1972.
Kohl et al Gas Purification (4th Ed.), Gulf Publishing Co., Houston TX USA; ISBN 0-87201-314-6, pp. 352-355, 1985.

Kymalainen et al, "The Fate of Nitrogen in the Chemical Recovery Process in a Kraft Pulp Mill", 1998 TAPPI Proceedings, International Chemical Recovery Conference, vol. 1, Jun. 1-4, 1998, Hyatt Westshore, Tampa, Florida.

*Primary Examiner*—Steven P. Griffin
*Assistant Examiner*—Timothy C Vanoy
*Attorney, Agent, or Firm*—Nixon & Vanderhye P.C.

[57] ABSTRACT

A method is provided for reducing emissions of harmful nitrogen compounds from a pulp mill (e.g. kraft mill) having malodorous gases which include ammonia and reduced sulphur compounds therein. The method is practiced by (a) treating the pulp mill malodorous gases to lower the ammonia content thereof (e.g. by washing them with a bisulfite solution, such as one produced from washing flue gases with sodium sulphite), and then (b) burning the malodorous gases (e.g. in a dedicated incinerator, recovery boiler, power boiler, or lime kiln) under conditions which effect oxidation of reduced sulfur compounds therein (e.g. with an air excess of at least about 3% and a temperature of over 800 degrees C) so as to reduce odor emissions and emissions of harmful nitrogen compounds from the pulp mill. In the method (a) and (b) may be practiced using malodorous gas from a steam stripper as part of the malodorous gases treated, and the operating conditions, including the pH, of the stream stripper may be regulated in order to reduce the ammonia content of the clean condensate it produces.

11 Claims, No Drawings

METHOD OF TREATING MELODOROUS GASES OF A PULP MILL

BACKGROUND AND SUMMARY OF THE INVENTION

The present invention relates to a method of treating malodorous gases of a pulp mill, for reducing emissions of harmful nitrogen compounds, such as nitrogen monoxide and nitrogen dioxide, from the mill.

In sulphate (kraft) cooking, cellulose material (usually wood chips) is treated in white liquor, which contains sodium hydroxide and sodium sulphide, so that lignin is hydrolyzed. Consequently, several organic sulphur compounds, such as methylmercoptan, dimethylsulphide and dimethyldisulphide are produced. These compounds, and hydrogen sulphide are the compounds which cause the unpleasant odor of many sulphate pulp mill vent gases. Gases containing these sulphur compounds are formed in several stages of the pulp manufacturing process, such as cooking and spent liquor evaporation. Malodorous sulphur compounds are most usually removed by collecting the malodorous gases from different sources and burning them in either a lime kiln, recovery boiler, or a separate incinerator. As a result of combustion, all sulphurous substances are oxidized to sulphur dioxide, sulphur trioxide and, in the presence of alkali, also to sodium sulphate, and they end up in flue gases. Sulphur dioxide is also formed in other stages of the pulp manufacturing process, e.g. in black liquor combustion. Stricter and stricter limitations have been set on sulphur dioxide emissions from pulp mills, and achieving these ever lower limits has required continuous development of processes and equipment.

Nitrogen oxides is another group of compounds which has received more and more attention, and which are desirably removed from kraft pulp mill off gases. Efforts to reduce emissions of nitrogen oxides have been focused mostly on black liquor combustion, the lime kiln, and the power boiler. Nitrogen compounds originate from either thermal oxidation of nitrogen in the combustion air or reduction and subsequent oxidation of the nitrogen bound to fuel, e.g., black liquor. In the reducing conditions typically prevailing in the furnace of the recovery boiler, in the combustion processes the nitrogen which has been introduced with feed liquor into the furnace is first converted to ammonia and nitrogen compounds ending up in the chemical melt. In conventional combustion or in combustion effected with staged oxidation, i.e., air is introduced from several different levels, such as primary, secondary, tertiary, and quartenary airs ("low $NO_x$ combustion"), this ammonia forms molecular nitrogen and nitrogen oxides that are likely harmful to the environment. Typically, half of the above-identified ammonia is converted to nitrogen oxides and the other half to nitrogen gas. By low NOx combustion (with staged air feed when the understoichiometric conditions turn to overstoichiometeric conditions), conversion of the above-identified ammonia to nitrogen oxides can be reduced, typically by about 20%. Staged air feed and various auxiliary processes attached thereto have enabled considerable lowering of nitrogen oxide emissions from the recovery boiler. Although black liquor combustion is satisfactorily controllable, pulp mills have not been able to lower the total emissions of nitrogen oxides in a desired manner.

According to the present invention, there is provided a method of controlling emissions of harmful nitrogen compounds, especially nitrogen oxides, from a pulp mill in a more efficient way than in the prior art. The invention relates to a method in which malodorous gases of a pulp mill are burned in order to oxidize reduced sulphur compounds, and it is a characteristic feature of the present invention that prior to burning the malodorous gases are treated in order to lower their ammonia content, and ultimately reduce emissions of harmful nitrogen compounds from the mill.

According to one aspect of the invention there is provided a method of reducing emissions of harmful nitrogen compounds from a pulp mill (particularly a kraft mill) having malodorous gases which include ammonia and reduced sulphur compounds therein. The method comprises: (a) Treating the pulp mill malodorous gases to lower the ammonia content thereof; and then (b) burning the malodorous gases under conditions which effect oxidation of the reduced sulphur compounds therein, so as to reduce odor emissions and emissions of harmful nitrogen compounds from the pulp mill.

In the method (b) may be practiced using a dedicated incinerator, a recovery boiler, power boiler, or lime kiln. Preferably (a) is practiced by washing the malodorous gases with a bisulphite solution. Also, preferably (b) is practiced to produce flue gases; and the method further comprises (c) washing the flue gases with a sodium sulphite solution to produce sodium bisulfite; and (a) is practiced by washing the malodorous gases with the bisulphite solution from (c).

Typically the pulp mill includes a steam stripper in which foul condensates of the mill are cleaned to produce clean condensate and discharge malodorous gas; and preferably (a) and (b) are practiced using malodorous gas from the steam stripper as part of the malodorous gases treated. The method also preferably comprises regulating the operating conditions, including the pH, of the stream stripper in order to reduce the ammonia content of the clean condensate.

In the method (a) may be alternatively practiced by washing the malodorous gases with at least one of acid bleaching effluent, and waste acid from a chlorine dioxide plant. Preferably (b) is practiced with at least about a 3% (e g. about 34%) excess of air and at a temperature of over about 800 degrees C. Also (a) and (b) may be practiced using HCLV gases as the malodorous gases.

The pulp mill typically has a waste water purification plant; and the method further comprises, after the practice of (a), transporting the bisulfite solution used for washing to the waste water purification plant. The pulp mill also has a bleach plant; and the method may alternatively or further comprise, after the practice of (a), transporting the bisulfite solution used for washing to the bleach plant.

According to another aspect of the invention, a method of treating kraft pulp mill malodorous gases which include ammonia and reduced sulphur compounds therein is provided, comprising: (a) washing the kraft pulp mill malodorous gases with a bisulfite solution to lower the ammonia content thereof; and then (b) burning the malodorous gases under conditions which effect oxidation of the reduced sulphur compounds therein. In the method (b) is practiced to produce flue gases; and the method further comprises (c) washing the flue gases with a sodium sulphite solution to produce sodium bisulfite; and (a) is practiced by washing the malodorous gases with the bisulphite solution from (c). Other details of this aspect of the invention are also as described above.

It is the primary object of the present invention to enhance the environmental friendliness of pulp mills, particularly kraft pulp mills. This and other objects of the invention will become apparent from the detailed description and appended claims.

DETAILED DESCRIPTION

It has been surprisingly found according to the present invention, that by testing the typical malodorous gases of a pulp mill, which gases contain ammonia, by removing the ammonia it is possible to influence the amount of nitrogen oxides formed in combustion of malodorous gases. It is known that amino acids contained by the cellulose material (wood) are decomposed during cooking, but it has not heretofore been believed that ammonia originating from amino acids would end up in malodorous gases and condensates during chemical pulping. It has been believed instead that nitrogenous decomposition products of amino acids, which amino acids have been produced during cooking, stay bound to the black liquor after cooking until the black liquor is combusted and nitrogen compounds are released. Now, it has been surprisingly found that ammonia is released from black liquor during cooking and evaporation. Ammonia also escapes to the chemical circulation of the mill elsewhere in the process, to such places where streams from the evaporation plant are conveyed, such streams being, for example, condensate conveyed to the dissolver of the recovery boiler. It is possible, and in fact likely, that closing of the pulp mill circulations contributes to the surprising occurrence of ammonia in malodorous gases.

As for emissions of harmful nitrogen compounds in a pulp mill, burning of malodorous gases, especially high concentration, low volume (HCLV) gases, has become problematic. It has been discovered recently that the emission of nitrogen oxides occuring in separate burning of malodorous gases may be as much as half of the nitrogen emissions of the entire pulp mill. Up to now, nitrogen emissions from the recovery boiler and lime kiln have been successfully limited, but not much attention has been paid to burning malodorous gases.

The purpose of burning malodorous gases is to oxidize the reduced sulphur compounds, such as hydrogen sulphide, contained in the gas, to sulphur dioxide, and therefore the combustion has to take place with a considerable excess of air (e.g., about 3 to 4%) and at a high temperature (e.g. over about 800° C.). Thereby, the ammonia contained in the malodorous gas will oxidize to nitrogen oxides.

When ammonia is removed from the malodorous gases prior to combustion, the nitrogen oxide content of the flue gas resulting from the combustion is significantly lower compared with the values achieved according to the prior art.

In practice, flue gases are washed after burning, in order to remove sulphur dioxide, usually with water or alkaline washing fluid which contains sodium hydroxide, sodium carbonate, or weak white liquor. Sulphur dioxide may be almost completely removed with an alkaline solution, but a problem is nitrogen oxides, especially nitrogen monoxide, which can only partly be removed in the washer. This drawback is eliminated by the present invention.

It is also known that sulphur dioxide may be separated from gases containing sulphur dioxide by using sodium sulphite as a washing fluid, so that the following reaction takes place in the absorption stage:

(1) $SO_2 + Na_2SO_3 + H_2O \rightarrow 2\ NaHSO_3$

A technique for removing ammonia from malodorous gases is to use bisulphite solution formed in the above described [(1)] removal of sulphur dioxide, to wash the malodorous gas to be burned, so that, according to the reaction (2) $2\ NH_3 + NaHSO_3 + H_2O \rightarrow (NH_4)_2SO_3 + NaOH$ A solution is received which contains ammonium sulphite. It has been established in laboratory tests that over 99% of the ammonia is captured in the bisulphite solution. Because the volume flow of the solution is not significant compared to the total waste water volume of the mill, the solution may be conveyed to the waste water purification plant of the mill to be used as nutrient, without extra costs that are unacceptably high. The ammonia solution may also be used elsewhere in the process, e.g., in pulp bleaching in the mill's bleach plant.

The washing fluid may also, or alternatively, be some other suitable solution from the pulp mill, such as acid bleaching effluent, or waste acid from a chlorine dioxide plant. The pH of the solution should be either neutral or acid. Also other ways, known per se, of removing ammonia from gases may be utilized.

The present invention is especially suitable for separate burning of malodorous gases. The conditions during separate burning are especially suitable for formation of nitrogen oxides because of overstoichiometric conditions. However, it is also possible to apply the invention to other instances of burning malodorous gases, and to remove ammonia from malodorous gases prior to introduction into the lime kiln, recovery boiler, or power boiler of the mill, if the nitrogen oxide emissions as a result of combustion need to be further reduced.

Harmful effects of ammonia potentially remaining in the malodorous gases may be prevented by effecting separate burning with a staged method. In this method, the combustion air is supplied in several different stages in a way known per se. In combustion, nitrogen gas and nitrogen oxides are formed from the ammonia, but because of the staged air feed, conversion to harmful nitrogen compounds can be prevented.

The invention is especially suitable for treatment of high concentration, low volume (HCLV) gases, but also low concentration, high volume (LCHV) gases may be treated in accordance with the invention.

Black liquor evaporation produces condensates, in which ammonia may also be accumulated. These condensates are used, after potential purification, in different stages of the pulp manufacturing process, to replace fresh water The melt produced in the recovery boiler is often dissolved in condensate. Foul condensates are normally cleaned in a steam stripper, where condensate and steam are brought into contact with each other and impurities from the condensate are transferred to the steam. The steam is condensated, and uncondensed gases are burned together with a stream of other malodorous gases of the mill. By regulating the operating conditions of the stripper, separation of ammonia from the steam condensate may be improved, for example, by pH adjustment (e.g. to put the pH in a preferred range of about 7 to 12). In this manner, cleaner condensate is produced, for returning to the process, so that the concentration of ammonia in the process flows may be prevented. Heretofore, the nitrogen oxide emissions of the mill have not been influenced by regulating the ammonia content of the condensate.

The present invention provides a simple method of controlling emissions of harmful nitrogen compounds from a pulp mill, which has become ever more important due to stricter environmental regulations.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for removing ammonia, mercaptans and hydrogen sulfide out of paper pulp mill gases, comprising:

scrubbing the pulp mill gases with a solution containing at least one member selected from the group consisting of bisulfite ions; acid bleaching effluent and waste acid from a chlorine dioxide plant in a first scrub stage to produce a pulp mil gas containing a diminished quantity of ammonia;

passing the pulp mill gases through a combustor operated with a staged air feed to oxidize the mercaptans and hydrogen sulfide into sulfur dioxide while minimizing the oxidation of residual ammonia into nitrogen oxides, and scrubbing the pulp mill gases with a solution containing sulfite ions in a second scrub stage to produce a pulp mill gas containing a diminished quantity of sulfur dioxide.

2. A method as recited in claim 1 wherein the combuster is using a dedicated incinerator.

3. A method as recited in claim 1 wherein the pulp mill includes a steam stripper in which foul condensates of the mill are cleaned to produce clean condensate and discharge malodorous gas; and wherein malodorous gas from the steam stripper is at least part of the pulp mill gases treated.

4. The method of claim 3 further comprising maintaining the pH of the steam stripper in the range of 7 to 12 to reduce the ammonia content of the clean condensate produced in the steam stripper.

5. The method of claim 1 wherein the solution used for scrubbing the pulp mill gases in the second scrub stage contains bisulfite ions and is recycled to the first scrub stage.

6. The method of claim 1 wherein the combustor is a recovery boiler.

7. The method of claim 1 wherein the combustor is a power boiler.

8. The method of claim 1 wherein the combustor is a limekiln.

9. The method of claim 8 wherein the pulp mill gases come from a kraft mill.

10. The method of claim 1 wherein the pulp mill gases are high concentration, low volume (HCLV) gases.

11. A method as recited in claim 1 wherein the combuster is operated with at least about a 3% excess of air and at a temperature of over about 800 degrees C.

* * * * *